United States Patent
Engrand et al.

(10) Patent No.: US 10,364,792 B2
(45) Date of Patent: Jul. 30, 2019

(54) BRAKING SYSTEM FOR A HYDRAULIC MACHINE

(71) Applicant: POCLAIN HYDRAULICS INDUSTRIE, Verberie (FR)

(72) Inventors: Julien Engrand, Breuil le Sec (FR); Stéphane Vidal, Longueil Sainte Marie (FR); Gilles Grillon, Sacy le Grand (FR); Bertrand Bonnomet, La Croix Saint Ouen (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/712,219

(22) Filed: Sep. 22, 2017

(65) Prior Publication Data

US 2018/0087486 A1 Mar. 29, 2018

(30) Foreign Application Priority Data

Sep. 23, 2016 (FR) ...................................... 16 58965

(51) Int. Cl.
*F16D 13/52* (2006.01)
*F03C 1/047* (2006.01)
(Continued)

(52) U.S. Cl.
CPC .......... *F03C 1/0472* (2013.01); *F03C 1/0403* (2013.01); *F03C 1/047* (2013.01);
(Continued)

(58) Field of Classification Search
CPC .... F03C 1/0472; F03C 1/0403; F03C 1/0447; F03C 1/047; F04C 15/0084; F04B 1/0404;
(Continued)

(56) References Cited

U.S. PATENT DOCUMENTS 4,667,527 A 5/1987 Ehrlinger et al.
5,220,790 A * 6/1993 Allart .................... F03C 1/0447
60/435

(Continued)

FOREIGN PATENT DOCUMENTS

EP 1070847 A2 1/2001
GB 2172677 A 9/1986

*Primary Examiner* — Vishal R Sahni
(74) *Attorney, Agent, or Firm* — The Webb Law Firm

(57) ABSTRACT

A hydraulic machine (1) comprising first and second brake elements (92, 93), a spring washer (65) tending to urge the first and second brake elements (92, 93) in a braking direction, and a brake release piston (61) configured to act on the spring washer (65) in a direction opposing the braking direction, the hydraulic machine being characterized in that the brake release piston (61) comprises a primary brake release piston (61*a*) associated with a primary brake release chamber (62*a*), and a secondary brake release piston (61*b*) associated with a secondary brake release chamber (62*b*), said primary and secondary chambers (62*a*, 62*b*) extending radially around the shaft (2) in such a manner that projections of the primary brake release chamber (62*a*) and of the secondary brake release chamber (62*b*) onto a plane perpendicular to a longitudinal axis (X-X) defined by the axis of rotation of the hydraulic machine (1) are superposed, at least in part.

9 Claims, 4 Drawing Sheets

(51) Int. Cl.
    *F03C 1/04* (2006.01)
    *F16D 65/18* (2006.01)
    *F03C 1/40* (2006.01)
    *F16D 55/40* (2006.01)
    *F04B 1/04* (2006.01)
    *F04B 1/047* (2006.01)
    *F04B 1/06* (2006.01)
    *F04B 49/02* (2006.01)
    *B60K 7/00* (2006.01)
    *B60T 1/06* (2006.01)
    *B60T 13/22* (2006.01)
    *F16D 55/38* (2006.01)
    *F16D 55/00* (2006.01)
    *F16D 121/12* (2012.01)

(52) U.S. Cl.
    CPC .......... *F03C 1/0447* (2013.01); *F04B 1/0404* (2013.01); *F04B 1/047* (2013.01); *F04B 1/06* (2013.01); *F04B 49/02* (2013.01); *F16D 13/52* (2013.01); *F16D 55/40* (2013.01); *F16D 65/186* (2013.01); *B60K 7/0015* (2013.01); *B60K 2007/0092* (2013.01); *B60T 1/065* (2013.01); *B60T 13/22* (2013.01); *F16D 55/38* (2013.01); *F16D 2055/0058* (2013.01); *F16D 2121/12* (2013.01)

(58) Field of Classification Search
    CPC .. F04B 1/047; F04B 1/06; F04B 49/02; F16D 13/52; F16D 55/38; F16D 55/40; F16D 65/186
    See application file for complete search history.

(56) References Cited

U.S. PATENT DOCUMENTS 8,662,259 B2* 3/2014 Vidal .................. F16D 59/02
            188/170
2011/0253488 A1 10/2011 Vidal et al.

* cited by examiner

BRAKING SYSTEM FOR A HYDRAULIC MACHINE

FIELD OF THE DISCLOSURE

The present disclosure relates to the field of hydraulic machines, and more particularly to a braking system for a hydraulic machine, e.g. a hydraulic machine having radial pistons and a multi-lobe cam.

STATE OF THE PRIOR ART

Hydraulic machines commonly include a braking system presenting a plurality of disks in a stack, some of them being constrained to rotate with the rotor and others being constrained to rotate with the stator. The brake disks are configured in such a manner as to stop the rotor moving relative to the stator by means of friction resulting from contact between the disks.

Hydraulic machines typically include a static brake, comprising a spring washer adapted to apply a clamping force on the brake disks so as to tend to prevent the rotor from rotating relative to the stator, and a brake release piston configured to apply a brake release force to the spring washer, thus tending to unclamp the brake disk and enable the rotor to rotate relative to the stator.

Nevertheless, constraints in terms of braking torque are increasing, which implies that the brake washers used are becoming ever stronger, thereby requiring a large pressure to be applied in order to disengage the static brake, while continuing to be under strict constraints in terms of overall size.

This increase in constraints has made it necessary to use high pressures, typically lying in the range 100 bar to 130 bar in order to release the brake of certain hydraulic machines. Unfortunately, the use of such pressures is not acceptable in certain applications, in particular because of the associated constraints and risks.

SUMMARY OF THE DISCLOSURE

The present disclosure relates to a hydraulic machine comprising a shaft and a casing mounted to rotate relative to each other by means of a bearing, the hydraulic machine comprising:

first brake elements constrained to rotate with the casing;
second brake elements constrained to rotate with the shaft;
the first and second brake elements forming a stack and being configured so as to enable the casing to be constrained to rotate with the shaft when they are put into contact;
a spring washer mounted to bear against the casing and tending to urge the first and second brake elements in a braking direction, tending to cause the first and second brake elements to be put into contact; and
a brake release piston configured to act on the spring washer in a direction opposing the braking direction;
the hydraulic machine being characterized in that:
the brake release piston comprises a primary brake release piston associated with a primary brake release chamber, and a secondary brake release piston associated with a secondary brake release chamber, said primary and secondary chambers being connected together and adapted to exert thrust force respectively on the primary piston and on the secondary piston; and
said primary and secondary chambers being arranged in succession along a longitudinal direction of the shaft and extending radially around the shaft in such a manner that projections of the primary brake release chamber and of the secondary brake release chamber onto a plane perpendicular to a longitudinal axis defined by the axis of rotation of the hydraulic machine are superposed, at least in part.

In a variant, the hydraulic machine further comprises a chamber separator configured to separate the primary and secondary pistons in such a manner that the pressure within each of the primary and secondary chambers act on only one face of a single piston, i.e. the secondary chamber does not exert pressure on the face of the primary piston facing away from the primary chamber.

The chamber separator then typically includes a hole to enable the brake release pressure to be communicated between the primary and secondary brake release chambers.

In an example, the primary brake release chamber is defined by the casing and by the primary brake release piston, and the secondary brake release chamber is defined by the chamber separator and by the secondary brake release piston.

In an example, in projection onto a plane perpendicular to a longitudinal axis defined by the axis of rotation of the hydraulic machine, the projections of the primary brake release chamber and of the secondary brake release chamber are superposed, at least in part, in such a manner that the projection of the secondary brake release chamber covers at least 30% of the projection of the primary brake release chamber.

In an example, the hydraulic machine further comprises a braking piston interposed between the stack and the brake release piston, and associated with a braking chamber configured to apply a force on the braking piston tending to urge it in a braking direction tending to cause the first and second brake elements to be put into contact.

In an example, the brake release chamber is connected to a pressure feed source configured to deliver a pressure less than or equal to 30 bar.

In an example, the primary brake release piston moves in translation in an intermediate chamber in fluid flow connection with an internal volume of the casing.

By way of example, the hydraulic machine is a hydraulic machine having radial pistons and a multi-lobe cam, comprising a cylinder block defining a plurality of cylinders extending radially around the longitudinal axis of the shaft and having pistons arranged therein facing a multi-lobe cam.

BRIEF DESCRIPTION OF THE DRAWINGS

The disclosure and its advantages can be better understood on reading the following detailed description of various embodiments of the disclosure given as non-limiting examples. The description refers to the accompanying sheets of figures, in which.

In the figures, elements in common are identified by numerical references that are identical.

DETAILED DESCRIPTION OF EMBODIMENTS

Figure 1:
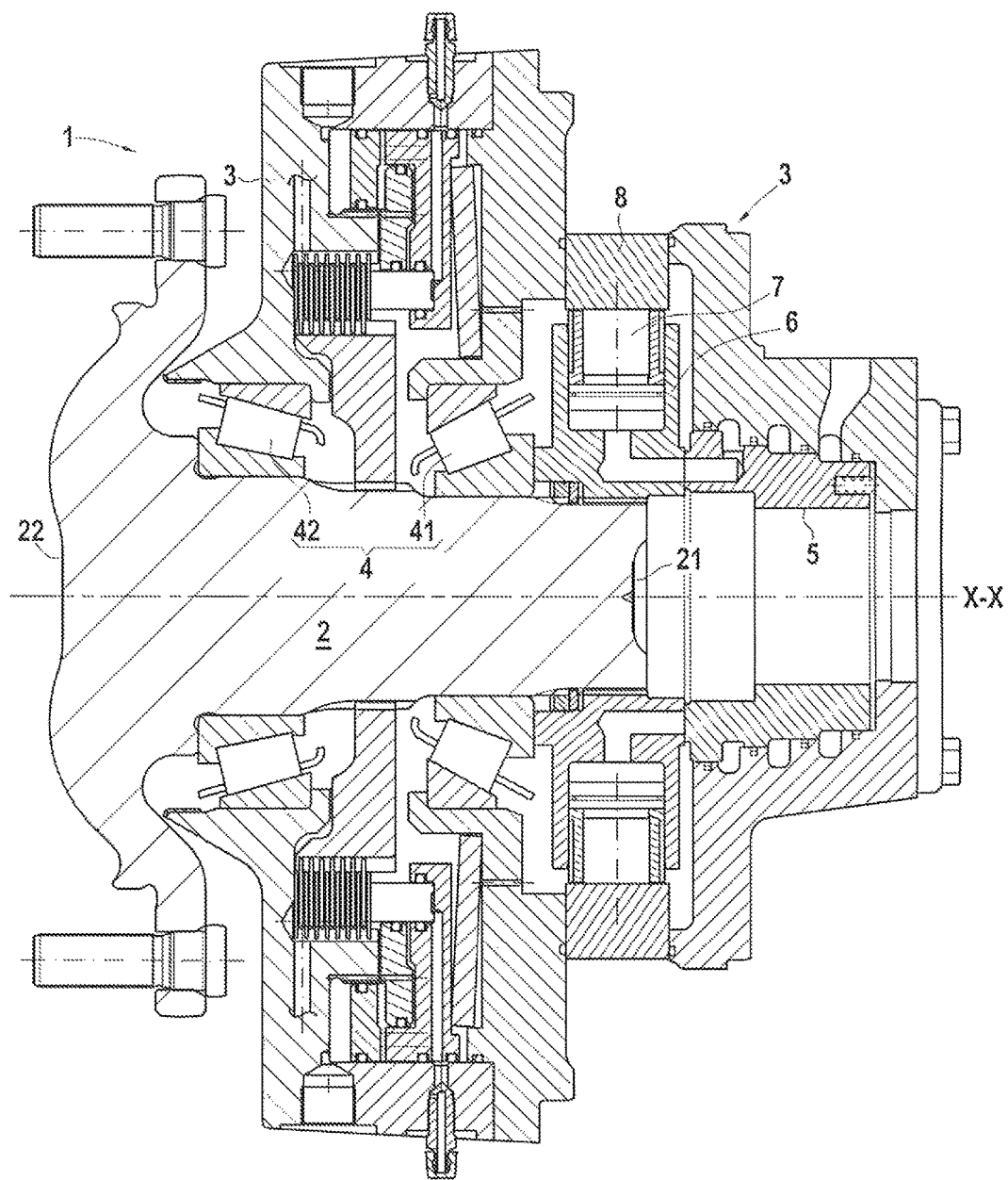
FIG. 1 is a section view of a hydraulic machine in an aspect of the disclosure.
Figure 2:
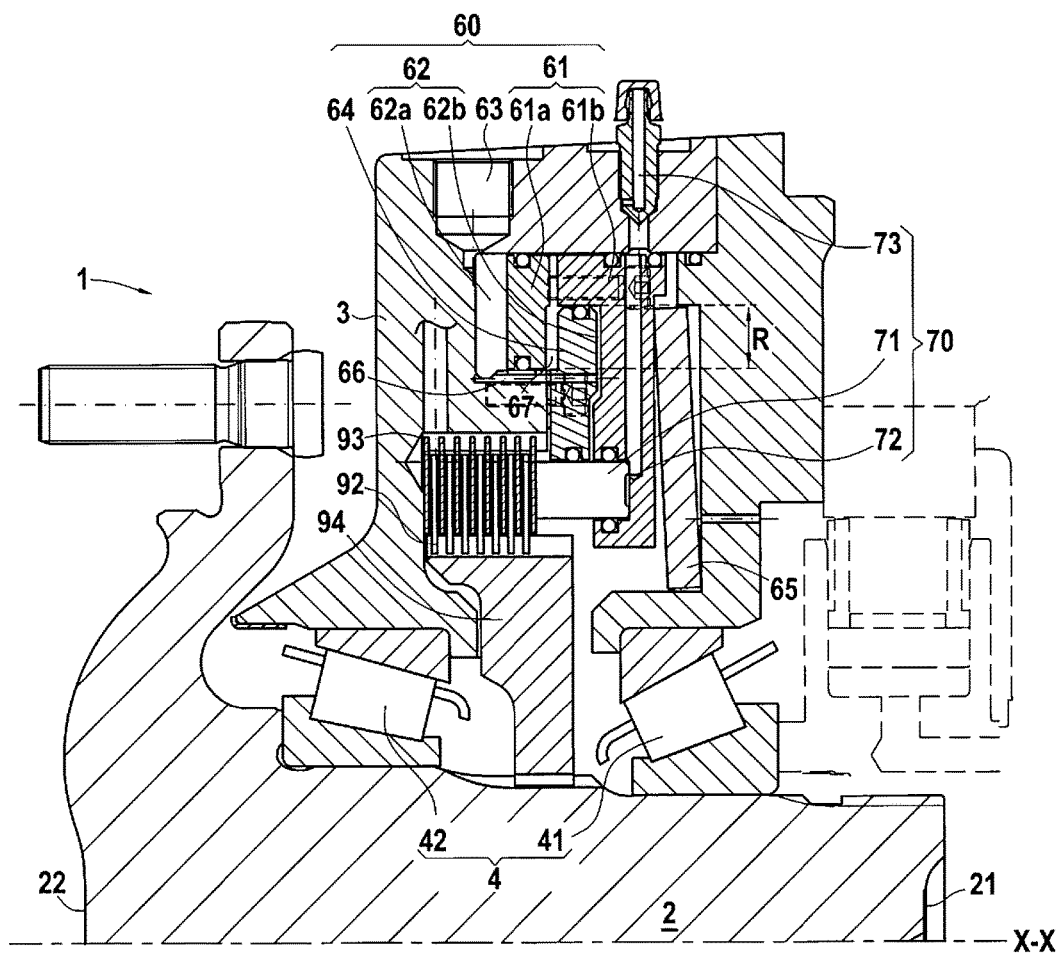
FIG. 2 is a detailed view of a region of FIG. 1 and showing the braking system in detail.

FIGS. 1 and 2 are two section views of a hydraulic machine in an aspect of the disclosure, FIG. 2 being a detailed view of the braking system shown in FIG. 1.

These figures show a hydraulic machine 1 comprising a shaft 2 and a casing 3 mounted to rotate relative to each other by means of a bearing 4. The shaft 2 defines an axis of rotation extending in a longitudinal direction X-X. A proximal end 21 and a distal end 22 of the shaft 2 are defined, the proximal end being closer to the cylinder block 6, as defined below.

In this example, the hydraulic machine 1 is a hydraulic machine having radial pistons, comprising a valve 5, and a cylinder block 6 in which pistons 7 are arranged facing a multi-lobe cam 8. In this example, the multi-lobe cam 8 is formed by a portion of the casing 3. The cylinder block 6 is mounted to be stationary relative to the shaft 2, so that the two elements 6 and 2 are constrained together in rotation, e.g. by means of fluting. The valve 5 is positioned extending the proximal end 21 of the shaft 2.

The hydraulic machine 1 may have a rotary shaft and a stationary cam, or vice versa. The structure of such a hydraulic machine is well known, and is not described in greater detail below.

The bearing 4 comprises two rolling elements 41 and 42, in this example two conical roller bearings spaced apart from each other in the longitudinal direction of the shaft 2. The rolling element 41 is thus referred to as the proximal rolling element 41, while the rolling element 42 is referred to as the distal rolling element 42.

The hydraulic machine also has a braking system 9 comprising a plurality of brake disks 93 secured to the casing 3 and a plurality of brake disks 92 secured to the shaft 2, in particular by fluting or grooves. These brake disks 93 and 92 thus form a stack of brake disks. In the example shown, the brake disks 92 are connected to the shaft via an intermediate part 94. Such an intermediate part 94 is optional and the brake disks 92 could be connected directly to the shaft 2.

The braking system also has two braking controls 60 and 70 configured to apply selectively a compression force on the brake disks 92 and 93 in order to cause relative rotary movements between the shaft 2 and the casing 3 to become locked.

The braking control 60 defines a brake that is said to be static. It includes a brake release piston 61 urged by a spring washer 65 to exert a clamping force on the brake disks 92 and 93, thereby holding them in an engaged position. The brake release piston 61 is associated with a brake release chamber 62 adapted to apply a pressure that generates a force opposing the thrust force applied by the spring washer 65, and thus tending to move the brake release piston 61 away from the brake disks 92 and 93, thereby causing the brake disks 92 and 93 to be disengaged and consequently releasing relative rotation between the casing 3 and the shaft 2. The brake release chamber 62 is fed via a pressurizing duct 63.

The spring washer 65 thus applies a clamping force on the brake release piston 61, which transmits the force to the brake disks 92 and 93, thereby holding them in the engaged position and locking relative rotation between the shaft 2 and the casing 3. Applying pressure via the pressurizing duct 63 serves to raise the pressure in the brake release chamber 62, thereby causing a brake release force to be applied opposing the clamping force exerted by the spring washer 65 and thus enabling the brake disks 92 and 93 to be unclamped so as to allow relative rotation between the shaft 2 and the casing 3.

The braking control 60 thus typically defines a parking brake, which is applied by default in the absence of a brake release pressure being applied.

The brake release piston 61 is made up of two pistons: a primary brake release piston 61a; and a secondary brake release piston 61b. These two brake release pistons 61a and 61b may be independent, and the brake release chamber 62 may thus also comprise two chambers: a primary brake release chamber 62a; and a secondary brake release chamber 62b, respectively controlling movement of the primary brake release piston 61a and of the secondary brake release piston 61b.

A chamber separator 64 is interposed between the primary brake release piston 61a and the secondary brake release piston 61b. The chamber separator 64 also serves to define the secondary brake release chamber 62b in such a manner that the pressure within it is not applied on the primary brake release piston 61a. Specifically, in the absence of such a chamber separator 64, the pressure within the secondary brake release chamber 62b would be applied against the primary brake release piston 61a so as to oppose the force resulting from pressure within the primary brake release chamber 62a. The chamber separator 64 is thus an element that is mounted stationary relative to the casing 3. The chamber separator 64 is mechanically connected to the casing 3 in stationary and leaktight manner, e.g. by means of a fastener screw. The chamber separator 64 also includes at least one hole 66 to allow brake release pressure to be communicated between the brake release chambers 62a and 62b, which at least one hole 66 may open out facing a hole made in the casing 3 and leading into the primary brake release chamber 62a. The hole 66 allows for a common pressurized fluid in each chamber 62a and 62b. In order for the hole in the casing 3 to be in alignment facing the hole 66 in the chamber separator 64, an indexing system is provided between the chamber separator 64 and the casing 3.

As can be seen in the figures, the primary brake release chamber 62a and the secondary brake release chamber 62b are arranged in succession along the longitudinal axis X-X defined by the shaft 2. The primary and secondary brake release pistons 61a and 61b are also arranged in succession along the longitudinal axis X-X defined by the shaft 2.

The primary brake release chamber 62a and the secondary brake release chamber 62b are arranged so as to extend at least in part over a common region defined by an inside diameter and an outside diameter around the longitudinal axis X-X defined by the shaft 2. This overlap or superposition region is identified by the reference R in FIG. 2. More precisely, when considering projections of the primary brake release chamber 62a and of the secondary brake release chamber 62b onto a plane perpendicular to the longitudinal axis X-X, these two brake release chambers 62a and 62b are superposed, at least in part.

The radial size of these two brake release chambers 62a and 62b is thus less than the sum of their two respective radial sizes. The value of the superposition serves to define the improvement achieved in terms of brake release force and overall size. In one embodiment, when considering the projections of the primary brake release chamber 62a and of the secondary brake release chamber 62b onto a plane perpendicular to the longitudinal axis X-X, the projection of the secondary brake release chamber 62b covers at least 30% of the area of the projection of the primary brake release chamber 62a, more precisely at least 50%, or indeed at least 60%, or even at least 75% of its area.

It should also be observed in the example shown that this overlap of the primary and secondary brake release chambers 62a and 62b gives rise likewise to an overlap of the primary and secondary brake release pistons 61a and 61b, such that the combined forces of the brake release portions 61a and 61b act against the spring washer 65.

The chamber separator 64 and the primary brake release piston 61a and the secondary brake release piston 61b are each provided with sealing elements so as to provide sealing in particular for the various brake release chambers 62a and 62b.

The zone between the chamber separator 64 and the primary brake release piston 61a defines an intermediate chamber 67, this intermediate chamber 67 defining the maximum possible movement for the primary brake release piston 61a.

In operation, applying a brake release pressure via the pressurizing duct 63 leads to pressure rising in the primary and secondary brake release chambers 62a and 62b, thereby causing the primary and secondary brake pistons 61a and 61b to move in a direction tending to oppose the clamping force exerted by the spring washer 65. The primary brake release piston 61a thus moves until it comes into abutment against the abutment section of the secondary brake release piston 61b if the two pistons are not already in contact and applies a releasing force to the secondary brake release piston 61b and the secondary brake release piston applies a releasing force to compress the spring washer 65. In the example shown, the pressurizing duct 63 opens out into the primary brake release chamber 62a. It can be understood that the pressurizing duct 63 could open out equally well into the primary brake release chamber 62a or into the secondary brake release chamber 62b, these two brake release chambers 62a and 62b being hydraulically connected together.

The primary brake release piston 61a thus moves in translation in the longitudinal direction in the intermediate chamber 67 situated between firstly the primary brake release piston 61a and secondly both the secondary brake release piston 61b and also the chamber separator 64. The intermediate chamber 67 is typically in fluid flow connection with the inside volume of the casing 3 (typically via a hole or a groove formed in the chamber separator 64, in a plane that is not visible in the figures), and is thus at the same pressure as the casing, i.e. typically at a pressure that is substantially zero. The casing is typically connected to a drain, thus making it possible to avoid pressure rising within the casing. Sealing between the chamber separator 64 and the casing 3 is provided by way of example by a flat gasket of the metal-plastics type, thereby allowing fluid to pass through the hole 66. An O-ring around the interface with the hole 66 may also be used. This sealing serves to prevent oil in the main brake release chamber 62 communicating with the intermediate chamber 67 and with the casing.

The secondary brake release piston 61b is already bearing against the spring washer 65 delivering clamping force that therefore opposes the resultant of the pressure within the secondary brake release chamber 62b. Thus, it can be understood that when the primary brake release piston 61a is not in contact with the secondary brake release piston 61b, the primary brake release piston 61a moves faster than the secondary brake release piston 61a under the effect of the pressure applied via the pressurizing duct 63, insofar as only the internal pressure of the casing opposes its movement, whereas the spring washer 65 opposes movement of the secondary brake release piston 61b. The secondary brake release piston 61b may thus be made as a single part, or it may be made up of a plurality of parts that are connected together, in particular by assembly means such as screws or by points of contact.

Once the brake release pistons 61a and 61b are in contact, the forces resulting from the pistons within the primary and secondary brake release chambers 62a and 62b are added together, thereby increasing the brake release force that is generated. It should be observed that the brake release pistons 61a and 61b may be in contact from the beginning, or the primary brake release piston 61a may have only a very short stroke before coming into contact with the secondary brake release piston 61b. Operation nevertheless remains similar.

On reading the above, and in the light of the figures, it can be understood that the two brake release pistons 61a and 61b as proposed make it possible to obtain a brake release force that is greater than can be obtained with a single brake release piston of identical radial size. The pressure required for opposing the clamping force applied by the spring washer 65 and thus unclamping the brake disks is thus reduced, and typically lies in the range 12 bar to 30 bar. This solution makes it possible to release the brake with lower pressure and unchanging size or to reduce size while conserving the brake release pressure.

In a variant, the brake release pistons 61a and 61b may be secured together after being positioned in the hydraulic machine 1, typically by assembly elements such as bolts. Operation is then similar to that described above with the primary and secondary brake release pistons 61a and 61b then being held in contact with each other and constrained to move together in translation.

The hydraulic machine as shown also has a braking control 70 for controlling braking that is referred to as dynamic braking.

This braking control comprises a braking piston 71 adapted to apply a clamping force selectively against the brake disks 92 and 93. The braking piston 71 is controlled by a braking chamber 72 fed via a pressurizing duct 73. In the light of the figures, it can be understood that pressure rising within the braking chamber 72 leads to the braking piston 71 moving in a braking direction, tending to exert a clamping action the brake disks 92 and 93. In the example shown, the braking piston 71 is interposed between the brake release piston 61 (and more precisely the secondary brake release piston 61b) and the stack of brake disks, and the braking chamber 72 together with the pressurizing duct 73 are formed in the brake release piston 61, more precisely in the secondary brake release piston 61b. This braking piston 71 may be made in the form of an annular piston as shown in the figures, or else in the form of a plurality of essentially cylindrical braking pistons. Sealing gaskets are present around the braking piston 71 in order to avoid any communication between the braking chamber 72 and the secondary brake release chamber 62b, or between the braking chamber 72 and the casing and/or the intermediate chamber 67.

In a variant, the hydraulic machine could have only a static brake without a dynamic brake.

In the embodiment shown in the figures, the brake elements 92 and 93 are arranged between the valve 5 and the distal end 22 of the shaft 2. It can readily be understood that such an embodiment is not limiting, and that the braking system including the brake elements 92 and 93 may be positioned elsewhere, e.g. extending the valve 5 and the proximal end 21 of the shaft 2, co-operating with a brake shaft that is connected to the cylinder block, in particular by fluting.

The hydraulic machine 1 as shown in FIGS. 1 and 2 typically forms a stub axle for a vehicle wheel. It can readily be understood that the hydraulic machine as shown is not limited to such an application.

Figure 3:
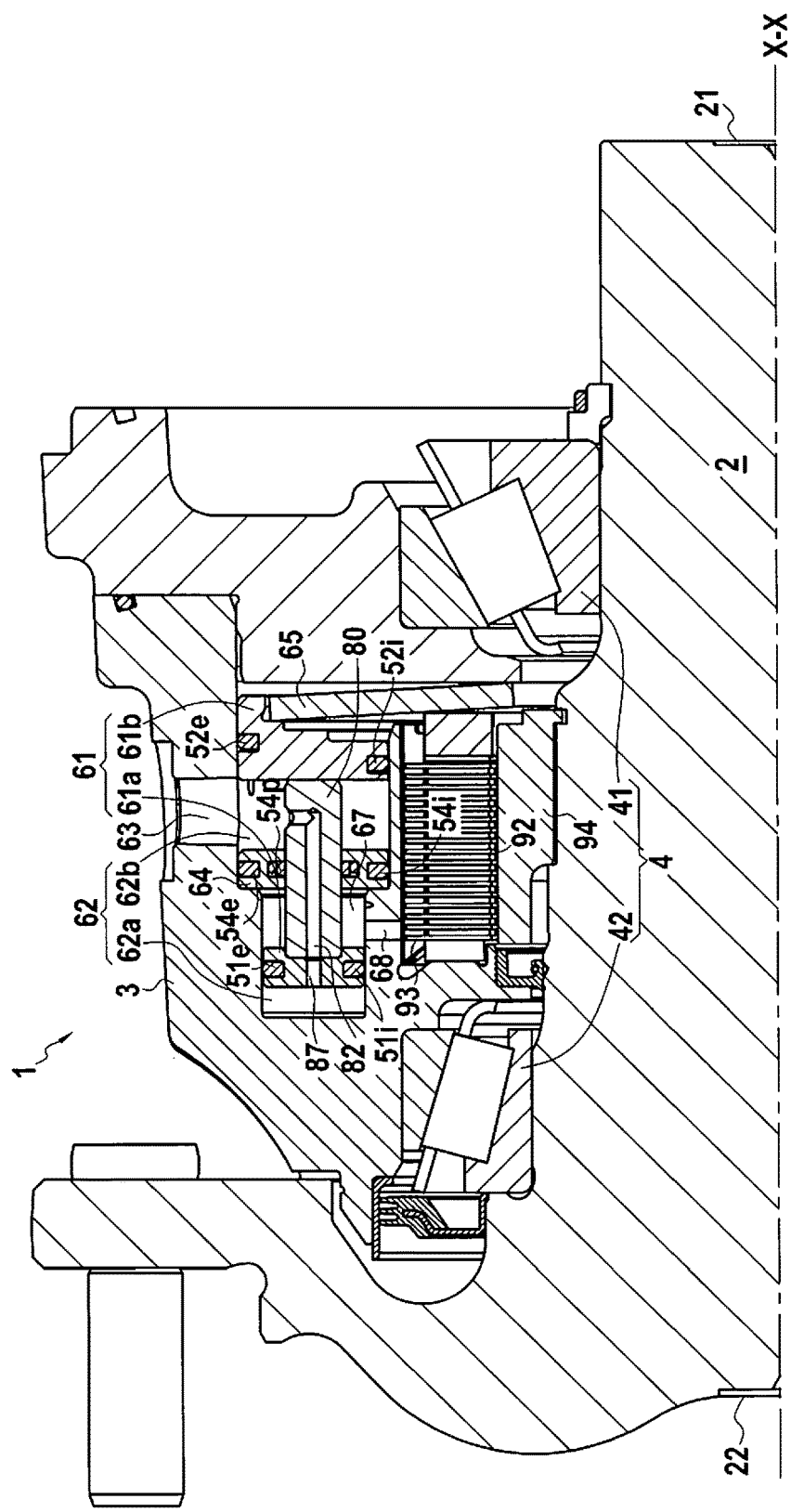
FIGS. 3 and 4 are section views of two other embodiments of a hydraulic machine in an aspect of the disclosure.
Figure 4:
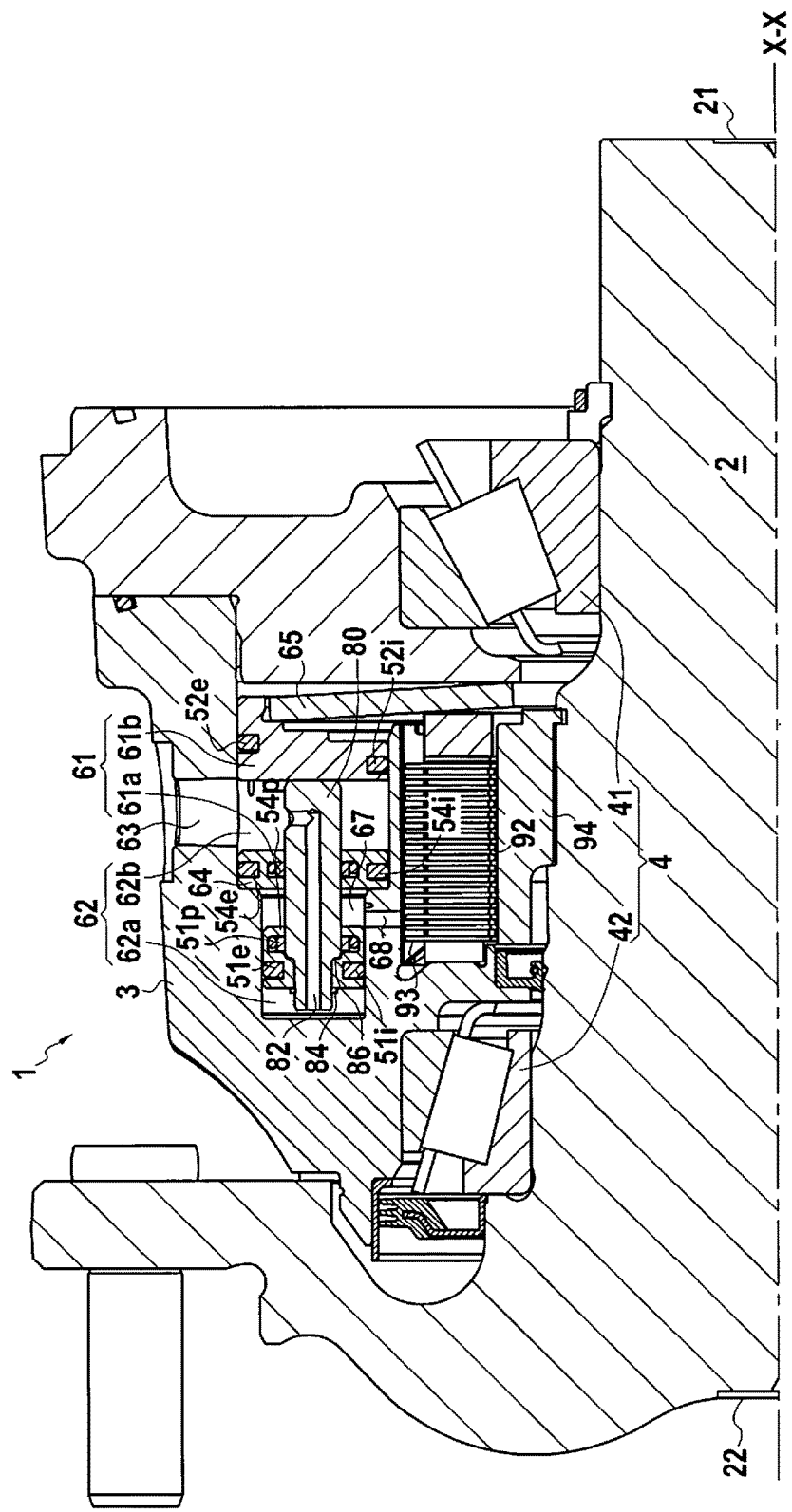

FIGS. 3 and 4 are two fragmentary views of other variants of another embodiment of the hydraulic machine as described above with reference to FIGS. 1 and 2. The various elements are identified by numerical references that are identical.

As described in detail with reference to the above embodiments, the brake release piston 61 is made of two pistons: a primary brake release piston 61a; and a secondary brake release piston 61b. The brake release chamber 62 comprises two chambers: a primary brake release chamber 62a; and a secondary brake release chamber 62b, respectively controlling movement of the primary brake release piston 61a and of the secondary brake release piston 61b.

A chamber separator 64 is interposed between the primary brake release piston 61a and the secondary brake release piston 61b. The chamber separator 64 also serves to define the secondary brake release chamber 62b in such a manner that the pressure within it is not applied against the primary brake release piston 61a.

In the same manner as for the embodiment described above with reference to FIGS. 1 and 2, the zone between the chamber separator 74 and the primary brake release piston 61a defines an intermediate chamber 67, this intermediate chamber 67 defining the maximum possible movement for the primary brake release piston 61a. The intermediate chamber 67 is connected to an internal volume of the casing 3 of the hydraulic machine via a hole 68, thereby ensuring that the intermediate chamber 67 is maintained substantially at ambient pressure.

As can be seen in FIG. 3, the primary brake release piston 61a has an outer sealing gasket 51e on its outer periphery and an inner sealing gasket 51i on its inner periphery, these sealing gaskets 51e and 51i thus providing leaktight contact with the walls of the casing 3 defining the primary brake release chamber 62a. Likewise, the secondary brake release piston 61b is provided with an outer sealing gasket 52e on its outer periphery and an inner sealing gasket 52i on its inner periphery, these sealing gaskets 52e and 52i thus providing leaktight contact with the walls of the casing 3 defining the secondary brake release chamber 62b. The chamber separator 64 is provided with an outer sealing gasket 54e and with an inner sealing gasket 54i thus providing leaktight contact with the walls of the casing 3 defining the intermediate chamber 67. The chamber separator 64 is also provided with a sealing gasket 54p provided around the inner outline of a hole made in the chamber separator 64 and via which a peg 80 passes through the chamber separator 64, the sealing gasket 54p sealing the connection between the chamber separator 64 and the peg 80.

The embodiment shown in FIG. 4 also has such sealing gaskets, together with a sealing gasket 51p positioned in a hole in the primary brake release piston 61a via which the peg 80 is inserted so as to seal the connection between the primary brake release piston 61a and the peg 80.

In the above-described examples, it can be understood that the various seals may be of various kinds, e.g. a sealing gasket of circular or oval section, optionally associated with a friction shoe, or more generally with any appropriate sealing element.

In these embodiments, the primary brake release piston 61a (i.e. the primary brake release piston that is not in direct contact with the spring washer 65) is coupled to one or more pegs 80 configured to bear against the secondary brake release piston 61b.

Such pegs 80 are secured to or in contact with the primary brake release piston 61a, and each of them includes an internal duct 82 so as to connect the primary brake release chamber 62a to the secondary brake release chamber 62b. In the embodiment shown in FIGS. 3 and 4, the pressurizing duct 63 opens out into the secondary brake release chamber 62b. The duct 82 formed through the peg 80 thus serves to connect the secondary brake release chamber 62b to the primary brake release chamber 62a.

In the embodiments shown in FIGS. 3 and 4, the peg 80 passes through the chamber separator 64. A sealed sliding connection is thus provided between each of the pegs 80 and the chamber separator 64.

In the embodiment shown in FIG. 3, the peg 80 extends from the primary brake release piston 61a to the secondary brake release piston 61b, but the peg 80 does not pass through the primary brake release piston 61a. The peg 80 is thus secured in leaktight manner to the primary brake release piston 61a at one of its ends via which the internal duct 82 opens out. The primary brake release piston 61a thus presents a through hole 87 made in line with the internal duct 82 in the peg 80 so as to connect the internal duct with the primary brake release chamber 62a.

In the embodiment shown in FIG. 4, the peg 80 passes through the primary brake release piston 61a, and the internal duct 82 in the peg 80 thus opens out directly into the primary brake release chamber 62a. The peg 80 is thus provided with a groove that receives a circlip 84, which co-operates with a shoulder 86 on the peg coming to bear against the primary brake release piston 61a so as to lock the peg 80 to move in translation with the primary brake release piston 61a.

The internal duct 82 in the peg 80 as shown in FIGS. 3 and 4 performs a function similar to the function of the hole 66 described above with reference to FIGS. 1 and 2. Operation is thus similar to the operation described above.

Although the present disclosure is described with reference to specific embodiments, it is clear that modifications and changes may be undertaken to those embodiments without going beyond the general ambit of the disclosure as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed, singly or in combination, to a device, and vice versa, all of the characteristics described with reference to a device can be transposed, singly or in combination with a method.

The invention claimed is:

1. A hydraulic machine comprising a shaft and a casing mounted to rotate relative to each other by means of a bearing, the hydraulic machine comprising:
   first brake elements constrained to rotate with the casing;
   second brake elements constrained to rotate with the shaft;
   the first and second brake elements forming a stack and being configured so as to enable the casing to be constrained to rotate with the shaft when they are put into contact;
   a spring washer mounted to bear against the casing and tending to urge the first and second brake elements in a braking direction, tending to cause the first and second brake elements to be put into contact; and
   brake release pistons configured to act on the spring washer in a direction opposing the braking direction;
   wherein
   the brake release pistons comprise a primary brake release piston associated with a primary brake release chamber, and a secondary brake release piston associated with a secondary brake release chamber, said primary and secondary chambers being fluidly connected together and adapted through a common pressurized fluid within each chamber to exert thrust forces respectively on the primary piston and on the secondary piston wherein with the chambers pressurized the primary brake release piston applies a releasing force to the secondary brake release piston and additionally the secondary brake release piston applies a releasing force to compress the spring washer such that the combined forces release act against the spring to the brake elements and allow the shaft to rotate; and said primary and secondary chambers being arranged in succession along a longitudinal direction of the shaft and extending radially around the shaft in such a manner that projections of the primary brake release chamber and of the secondary brake release chamber onto a plane perpendicular to a longitudinal axis defined by the axis of rotation of the hydraulic machine are overlapping, at least in part.

2. The hydraulic machine according to claim 1, further comprising a chamber separator configured to separate the primary and secondary brake release pistons in such a manner that the pressure within each of the primary and secondary chambers act on only one face of a single brake release piston.

3. The hydraulic machine according to claim 2, wherein the chamber separator includes at least one hole to enable the brake release pressure to be communicated between the primary and secondary brake release chambers.

4. The hydraulic machine according to claim 2, wherein:
the primary brake release chamber is defined by the casing and by the primary brake release piston; and
the secondary brake release chamber is defined by the chamber separator and by the secondary brake release piston.

5. The hydraulic machine according to claim 1, wherein, for a projection of each of the primary brake release chamber and the secondary brake release chamber onto planes perpendicular to a longitudinal axis defined by the axis of rotation of the hydraulic machine, the projections of the primary brake release chamber and of the secondary brake release chamber are superposed, at least in part, in such a manner that the projection of the secondary brake release chamber covers at least 30% of the projection of the primary brake release chamber.

6. The hydraulic machine according to claim 1, further comprising a braking piston interposed between the stack and the brake release piston, and associated with a braking chamber configured to apply a force on the braking piston tending to urge it in a braking direction tending to cause the first and second brake elements to be put into contact.

7. The hydraulic machine according to claim 1, wherein each brake release chamber is connected to a pressure feed source configured to deliver a pressure less than or equal to 30 bar.

8. The hydraulic machine according to claim 1, wherein the primary brake release piston moves in translation in an intermediate chamber in fluid flow connection with an internal volume of the casing.

9. The hydraulic machine according to claim 1, including a cylinder block defining a plurality of cylinders extending radially around the longitudinal axis of the shaft and having pistons arranged therein facing a multi-lobe cam.

* * * * *